US012541099B2

United States Patent
Epp et al.

(10) Patent No.: US 12,541,099 B2
(45) Date of Patent: Feb. 3, 2026

(54) OPTICAL PHASED ARRAY WITH GRATING STRUCTURE

(71) Applicant: TAARA CONNECT, INC., Sunnyvale, CA (US)

(72) Inventors: Paul Epp, Sunnyvale, CA (US); Andrei Kazmierski, Pleasanton, CA (US); Devin Brinkley, Redwood City, CA (US)

(73) Assignee: TAARA CONNECT, INC., Sunnyvale, CA (US)

( * ) Notice: Subject to any disclaimer, the term of this patent is extended or adjusted under 35 U.S.C. 154(b) by 366 days.

(21) Appl. No.: 18/234,197

(22) Filed: Aug. 15, 2023

(65) Prior Publication Data

US 2024/0192487 A1    Jun. 13, 2024

Related U.S. Application Data

(60) Provisional application No. 63/431,800, filed on Dec. 12, 2022.

(51) Int. Cl.
| | |
|---|---|
| *G02B 27/00* | (2006.01) |
| *G02B 5/18* | (2006.01) |
| *G02F 1/29* | (2006.01) |
| *H04B 10/112* | (2013.01) |

(52) U.S. Cl.
CPC ....... *G02B 27/0087* (2013.01); *G02B 5/1885* (2013.01); *G02F 1/292* (2013.01); *H04B 10/1123* (2013.01)

(58) Field of Classification Search
CPC .... G02B 3/08; G02B 27/0087; G02B 5/1885; G02F 1/292; H04B 10/1123
See application file for complete search history.

(56) References Cited

U.S. PATENT DOCUMENTS

| | | |
|---|---|---|
| 6,864,852 B2 | 3/2005 | Chiang et al. |
| 8,248,317 B1 | 8/2012 | Meagher et al. |
| 2002/0131121 A1 | 9/2002 | Jeganathan et al. |
| (Continued) | | |

FOREIGN PATENT DOCUMENTS

| | | |
|---|---|---|
| WO | 2022014737 A1 | 1/2022 |

OTHER PUBLICATIONS

International Search Report and Written Opinion for corresponding International Application No. PCT/US2023/082648 dated Mar. 26, 2024 (12 pages).

(Continued)

*Primary Examiner* — Jonathan Y Jung
(74) *Attorney, Agent, or Firm* — Botos Churchill IP Law LLP

(57) ABSTRACT

Aspects of the disclosure provide a system including a first optical communications terminal comprising. The first optical communications terminal may include a common aperture for transmitting signals and receiving signals. The first optical communications terminal may also include an optical phased array (OPA) architecture including a micro-lens array including a plurality of micro-lenses. Each micro-lens of the plurality of micro-lenses may have a plurality of concentric grooves arranged on a respective surface of that micro-lens. The OPA architecture may be configured for bidirectional communication with a second optical communications terminal.

10 Claims, 10 Drawing Sheets

(56) References Cited

U.S. PATENT DOCUMENTS

| | | |
|---|---|---|
| 2021/0116655 A1 | 4/2021 | Grieco et al. |
| 2021/0152243 A1* | 5/2021 | Hosseini ............ H04B 10/1123 |
| 2022/0128666 A1* | 4/2022 | Schrans ................. G02F 1/292 |
| 2022/0146903 A1* | 5/2022 | Watts ................. H04B 10/1123 |
| 2023/0039081 A1* | 2/2023 | McManamon ........... G02F 1/29 |

OTHER PUBLICATIONS

Flood, Kevin M, et al., "Proceedings of SPIE Continuous wide-angle beam steering using translation of binary microlens arrays and a liquid-crystal phased array", Jan. 1, 1990, XP055409169, Ret. Internet: https://www.spiedigitallibrary.org/conference-proceedings-of-spie [ret. on Sep. 22, 2017], pp. 1-10.

* cited by examiner

OPTICAL PHASED ARRAY WITH GRATING STRUCTURE

CROSS-REFERENCE TO RELATED APPLICATION

This application claims the benefit of U.S. Provisional Application No. 63/431,800, filed Dec. 12, 2022, the contents of which are incorporated by reference herein.

BACKGROUND

Wireless optical communication enables high-throughput and long-range communication, in part due to high gain offered by the narrow angular width of the transmitted beam. However, the narrow beam also requires that it must be accurately and actively pointed in order to remain aligned to an aperture of a communications terminal at the remote end. This pointing may be accomplished by small mirrors (e.g., MEMS or voice-coil based fast-steering mirror mechanisms) that are actuated to steer the beam. In other implementations, electro-optic steering of beams with no moving parts is used to steer the beam, which provides cost, lifetime and performance advantages. Optical Phased Arrays (OPAs) are a critical technology component, with added benefits of adaptive-optics, point-to-multipoint support, and mesh network topologies. Each active element in the OPA requires electro-optic phase shifting capability.

BRIEF SUMMARY

One aspect of the disclosure provides a system including a first optical communications terminal. The first optical communications terminal includes a common aperture for transmitting signals and receiving signals and an optical phased array (OPA) architecture. The OPA architecture including a micro-lens array including a plurality of micro-lenses, each micro-lens of the plurality of micro-lenses having a plurality of concentric grooves arranged on a respective surface of that micro-lens. The OPA is configured for bidirectional communication with a second optical communications terminal.

In one example, the system also includes the second optical communications terminal. In another example, the pluralities of concentric groves are imprinted on the respective surfaces of the plurality of micro-lenses. In another example, each of the pluralities of concentric grooves function as a Fresnel lens structure. In this example, the Fresnel lens structures are configured to expand a transmit signal prior to launch of the transmit signal from first communications terminal and focus a received signal received at the first communications terminal from the second communications terminal. In another example, the OPA architecture further includes an arrangement of 64 phase shifters or fewer for each micro-lens of the plurality of micro-lenses.

Another aspect of the disclosure provides a method of transmitting and receiving light in a communications terminal. The method includes receiving a receive signal through an aperture: passing the receive signal through an optical phased array (OPA) architecture including a micro-lens array including a plurality of micro-lenses, each micro-lens of the plurality of micro-lenses having a plurality of concentric grooves on a respective surface of that micro-lens: passing a transmit signal through the optical phased array including the concentric grooves: and sending the transmit signal through the aperture.

In one example, each of the pluralities of concentric grooves functions as a Fresnel lens structure. In another example, one of the pluralities of concentric grooves cause the transmit signal to expand when passed through a corresponding one of the plurality of micro-lenses. In another example, one of the pluralities of concentric grooves cause the receive signal to contract when passed through a corresponding one of plurality of micro-lenses.

DETAILED DESCRIPTION

Overview

Figure 1:
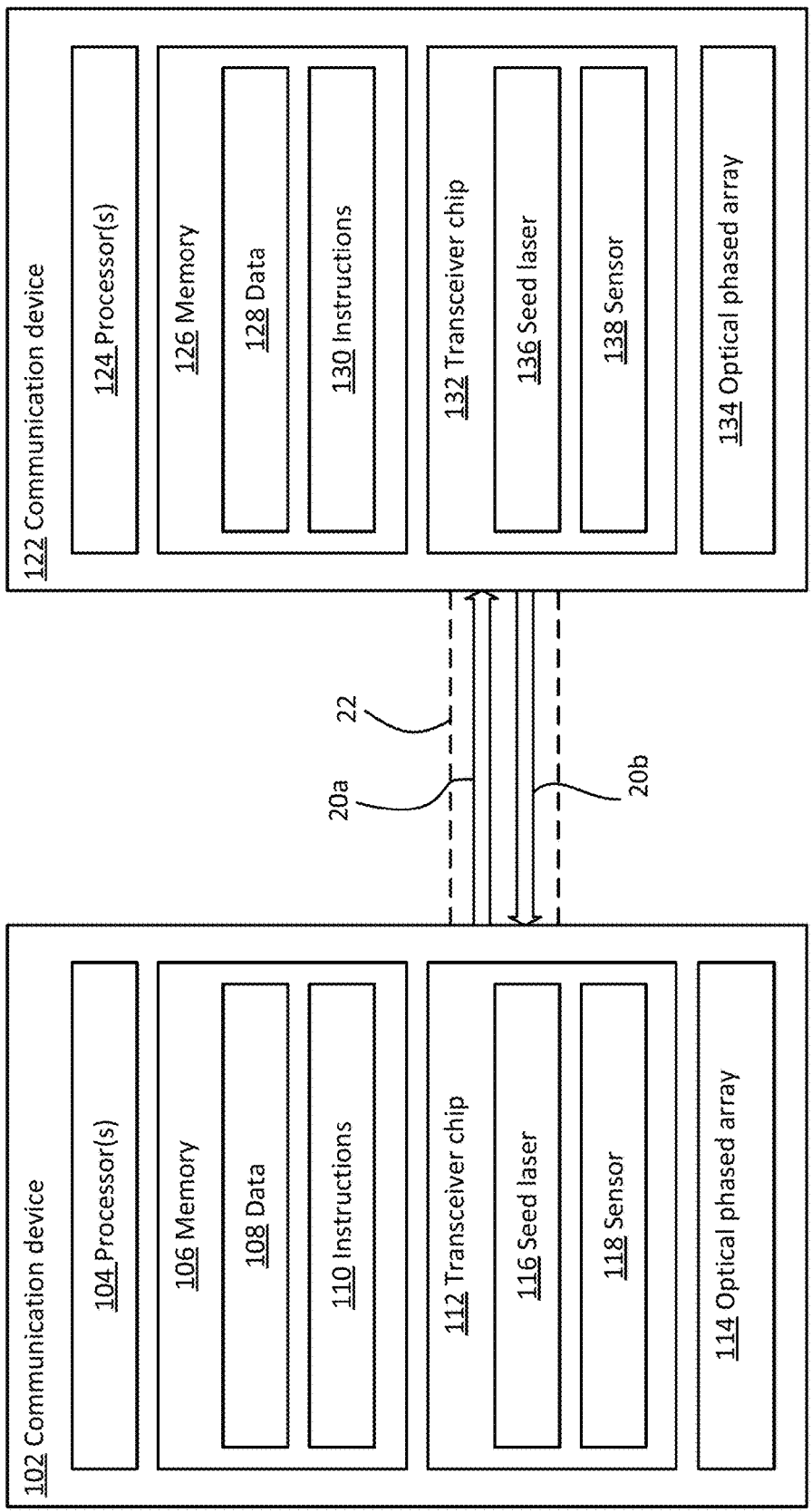
FIG. 1 is a block diagram of a system including a first communications terminal and a second communications terminal in accordance with aspects of the disclosure.

The technology relates to an optical phased array (OPA) architecture for a wireless optical communication terminal that performs wavefront sensing in a larger communication system. The OPA architecture may involve the use of an OPA chip with an integrated circuit (PIC). In some applications, OP As may require beam expansion telescopes in order to increase an effective aperture size of the communication terminal. However, typical beam expansion telescopes (whether refractive or reflective, Galilean or Keplerian, etc.) can be fairly large due to the features of the optics used within the beam expansion telescope. This may effectively "cancel out" any size-reduction advantage of using PIC OPAs in such communication terminals.

The OPA architecture may include a plurality of bidirectional features including a micro-lens array, an emitter associated with each micro-lens, a phase shifter for each micro-lens, and waveguides that connect the components in the OPA. The phase-adjustment capability of the OPA architecture may enable the OPA architecture to include some steering via tilt to a wavefront. In addition, each micro-lens may also include a series of concentric grooves which function as a micro-lens and a "global" lens structure across all of the plurality of micro-lenses of the micro-lens array. The micro-lens can be designed utilizing numerous different lens structures including fresnel lens, diffractive lens or meta-lens implementing micro-grooves, multi-step grooves or wavelength size pillars as the concentric grooves. For instance, the concentric grooves may result in. The density of the grooves may be selected based upon the focal length of the micro-lenses. For example, the concentric grooves may be imprinted on a surface of the micro-lenses as part of an etching or the molding process for manufacturing the micro-lenses. As discussed further below, the concentric grooves on each micro-lens may increase the local refractive tilt and result in a similar "global" effect across the micro-lens array of the OPA.

A spherical wavefront may contain a component of tilt which may be a result of a steering of a Tx beam or signal by the phase shifters of the OPA. However, the concentric grooves may enable even larger divergence of a transmit (Tx) signal. When the Tx signal passes through these surfaces, the Tx signal is expanded, whereas when a receive (Rx) beam or signal passes through these surfaces, the Rx signal is focused (narrowed).

The aforementioned tilt combined with the concentric grooves may emulate the effect of the first lens of a beam expansion telescope. As such, by utilizing concentric grooves on the micro-lenses of the micro-lens array, one or more of the optical elements of a typical beam expansion telescope (e.g., one of the optics or lenses) may be removed. However, in this example, the first optic would still be required to re-collimate the Tx signal prior to launch from the communications terminal.

The features described herein may provide an OPA architecture suitable for use in a communications terminal. Removing the second optic may significantly reduce the overall length required for expansion of the Tx signal. This, in turn, may save significant space within the communication terminal and allow for a smaller overall size without requiring additional steering or other mirrors or other features. In some instances, this may be a fairly significant reduction in size, weight, and cost of the communication terminal as compared to a communication terminal that utilizes a typical beam expansion telescope.

Example Systems

Figure 2:
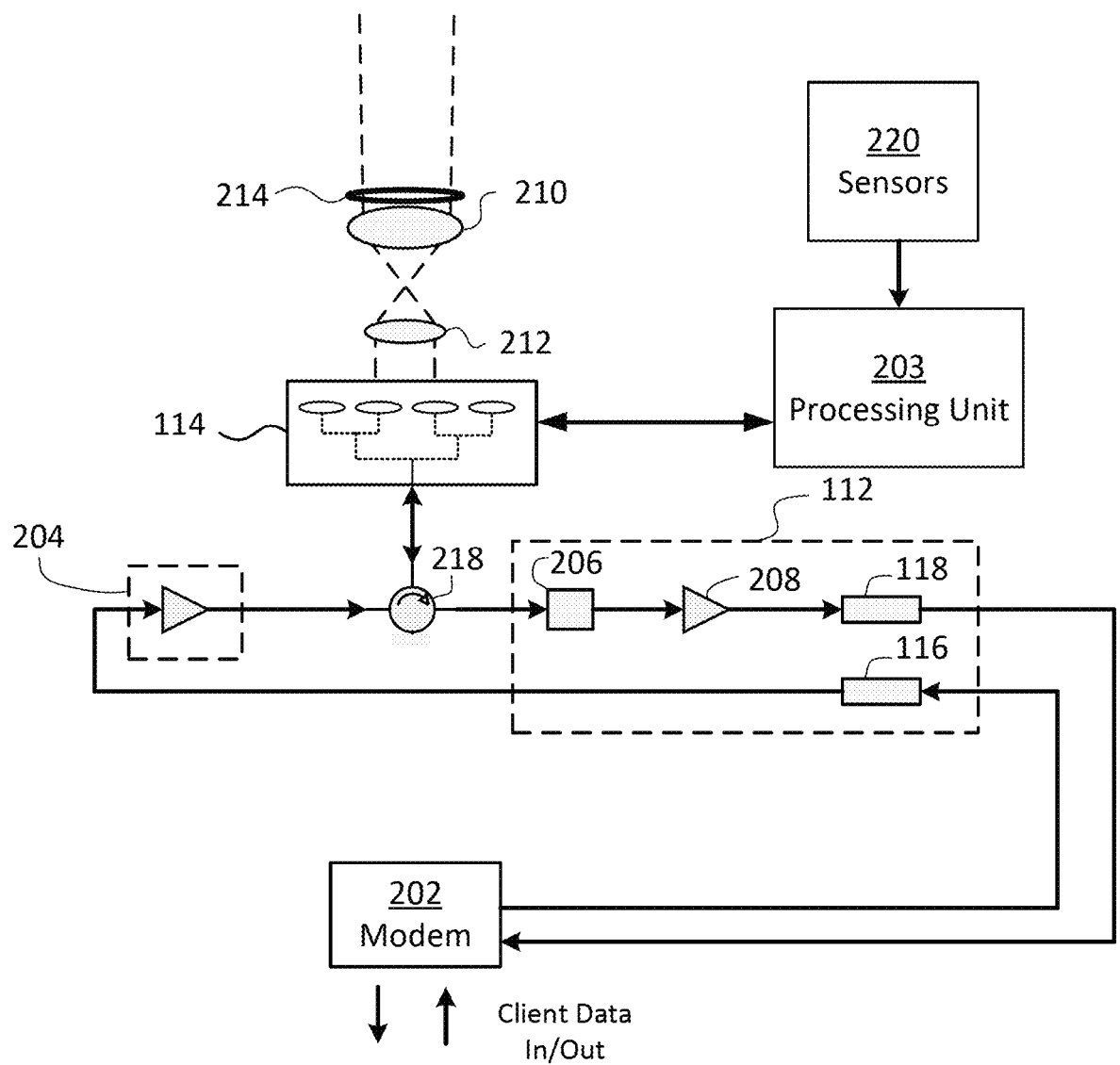
FIG. 2 is a pictorial diagram of an example system architecture for the first communication device of FIG. 1 in accordance with aspects of the disclosure.

FIG. 1 is a block diagram of a system 100 including the first communications terminal configured to form one or more links with a second communications terminal, for instance as part of a system such as a free-space optical communication (FSOC) system. FIG. 2 is a pictorial diagram of an example communications terminal 200, such as the first communications terminal of FIG. 1. For example, a first communications terminal 102 includes one or more processors 104, a memory 106, a transceiver photonic integrated chip 112, and an optical phased array (OPA) architecture 114. In some implementations, the first communications terminal 102 may include more than one transceiver chip and/or more than one OPA architecture (e.g., more than one OPA chip).

The one or more processors 104 may be any conventional processors, such as commercially available CPUs. Alternatively, the one or more processors may be a dedicated device such as an application specific integrated circuit (ASIC) or another hardware-based processor, such as a field programmable gate array (FPGA). Although FIG. 1 functionally illustrates the one or more processors 104 and memory 106 as being within the same block, such as in a modem 202 for digital signal processing shown in FIG. 2, the one or more processors 104 and memory 106 may actually comprise multiple processors and memories that may or may not be stored within the same physical housing, such as in both the modem 202 and a separate processing unit 203. Accordingly, references to a processor or computer will be understood to include references to a collection of processors or computers or memories that may or may not operate in parallel.

Memory 106 may store information accessible by the one or more processors 104, including data 108, and instructions 110, that may be executed by the one or more processors 104. The memory may be of any type capable of storing information accessible by the processor, including a computer-readable medium such as a hard-drive, memory card, ROM, RAM, DVD or other optical disks, as well as other write-capable and read-only memories. The system and method may include different combinations of the foregoing, whereby different portions of the data 108 and instructions 110 are stored on different types of media. In the memory of each communications terminal, such as memory 106, calibration information, such as one or more offsets determined for tracking a signal, may be stored.

Data 108 may be retrieved, stored or modified by the one or more processors 104 in accordance with the instructions 110. For instance, although the system and method are not limited by any particular data structure, the data 108 may be stored in computer registers, in a relational database as a table having a plurality of different fields and records, XML documents or flat files. The data 108 may also be formatted in any computer-readable format such as, but not limited to, binary values or Unicode. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data 108 may comprise any information sufficient to identify the relevant information, such as numbers, descriptive text, proprietary codes, references to data stored in other areas of the same memory or different memories (including other network locations) or information that is used by a function to calculate the relevant data.

The instructions 110 may be any set of instructions to be executed directly (such as machine code) or indirectly (such as scripts) by the one or more processors 104. For example, the instructions 110 may be stored as computer code on the computer-readable medium. In that regard, the terms "instructions" and "programs" may be used interchangeably herein. The instructions 110 may be stored in object code format for direct processing by the one or more processors 104, or in any other computer language including scripts or collections of independent source code modules that are interpreted on demand or compiled in advance. Functions, methods and routines of the instructions 110 are explained in more detail below.

The one or more processors 104 may be in communication with the transceiver chip 112. As shown in FIG. 2, the one or more processors in the modem 202 may be in communication with the transceiver chip 112, being configured to receive and process incoming optical signals and to transmit optical signals. The transceiver chip 112 may include one or more transmitter components and one or more receiver components. The one or more processors 104 may therefore be configured to transmit, via the transmitter components, data in a signal, and also may be configured to receive, via the receiver components, communications and data in a signal. The received signal may be processed by the one or more processors 104 to extract the communications and data.

The transmitter components may include at minimum a light source, such as seed laser 116. Other transmitter components may include an amplifier, such as a high-power semiconductor optical amplifier 204. In some implementations, the amplifier is on a separate photonics chip. The seed laser 116 may be a distributed feedback laser (DFB), light-emitting diode (LED), a laser diode, a fiber laser, or a solid-state laser. The light output of the seed laser 116, or optical signal, may be controlled by a current, or electrical signal, applied directly to the seed laser, such as from a modulator that modulates a received electrical signal. Light transmitted from the seed laser 116 is received by the OPA architecture 114.

The receiver components may include at minimum a sensor 118, such as a photodiode. The sensor may convert a received signal (e.g., light or optical communications beam), into an electrical signal that can be processed by the one or more processors. Other receiver components may include an attenuator, such as a variable optical attenuator 206, an amplifier, such as a semiconductor optical amplifier 208, or a filter.

The one or more processors 104 may be in communication with the OPA architecture 114. The OPA architecture may include a micro-lens array, an emitter associated with each micro-lens in the array, a plurality of phase shifters, and waveguides that connect the components in the OPA. The OPA architecture may be positioned on a single chip, an OPA chip. The waveguides progressively merge between a plurality of emitters and an edge coupler that connect to other transmitter and/or receiver components. In this regard, the waveguides may direct light between photodetectors or fiber outside of the OPA architecture, the phase shifters the waveguide combiners, the emitters and any additional component within the OPA. In particular, the waveguide configuration may combine two waveguides at each stage, which means the number of waveguides is reduced by a factor of two at every successive stage closer to the edge coupler. The point of combination may be a node, and a combiner may be at each node. The combiner may be a 2×2 multimode interference (MMI) or directional coupler.

The OPA architecture 114 may receive light from the transmitter components and outputs the light as a coherent communication beam to be received by a remote communications terminal, such as second communications terminal 122. The OPA architecture 114 may also receive light from free space, such as a communication beam from second communications terminal 122, and provides such received light to the receiver components. The OPA architecture may provide the necessary photonic processing to combine an incoming optical communications beam into a single-mode waveguide that directs the beam towards the transceiver chip 112. In some implementations, the OPA architecture may also generate and provide an angle of arrival estimate to the one or more processors 104, such as those in processing unit 203.

The first communications terminal 102 may include additional components to support functions of the communications terminal. For example, the first communications terminal may include one or more lenses and/or mirrors that form a telescope. The telescope may receive collimated light and output collimated light. The telescope may include an objective portion, an eyepiece portion, and a relay portion. As shown in FIG. 2, the first communications terminal may include a telescope including a first lens 210, a second lens 212, and an aperture 214 (or opening) through which light may enter and exit the communications terminal. For ease of representation and understanding, the aperture 214 is depicted as distinct from the first lens 210, though the first lens may be positioned within the aperture. The first communications terminal may include a circulator, such as a single mode circulator 218, that routes incoming light and outgoing light while keeping them on at least partially separate paths. The first communications terminal may include one or more sensors 220 for detecting measurements of environmental features and/or system components.

The first communications terminal 102 may include one or more steering mechanisms, such as one or more bias means for controlling one or more phase shifters, which may be part of the OPA architecture 114, and/or an actuated/steering mirror (not shown), such as a fast/fine pointing mirror. In some examples, the actuated mirror may be a MEMS 2-axis mirror, 2-axis voice coil mirror, or a piezoelectric 2-axis mirror. The one or more processors 104, such as those in the processing unit 203, may be configured to receive and process signals from the one or more sensors 220, the transceiver chip 112, and/or the OPA architecture 114 and to control the one or more steering mechanisms to adjust a pointing direction and/or wavefront shape. The first communications terminal also includes optical fibers, or waveguides, connecting optical components, creating a path between the seed laser 116 and OPA architecture 114 and a path between the OPA architecture 114 and the sensor 118.

The first communications terminal 102 may use a common aperture for transmit (Tx) and receive (Rx) signals for reasons of size, complexity, and inherent self-coalignment (e.g., bore sighting). However, this may result in the scattering of the strong Tx signal into the weak signal Rx channel, necessitating further Tx/Rx separation components downstream. In other words, because the Tx and Rx signs (i.e., light) follow the same path in the OPA architecture and the Tx signal may be relatively larger and stronger than the Rx signal, the two signals can mix together which may impede the detection of the Rx signal. To address this, an additional grating structure may be utilized within the OPA architecture 114.

Figure 3A:
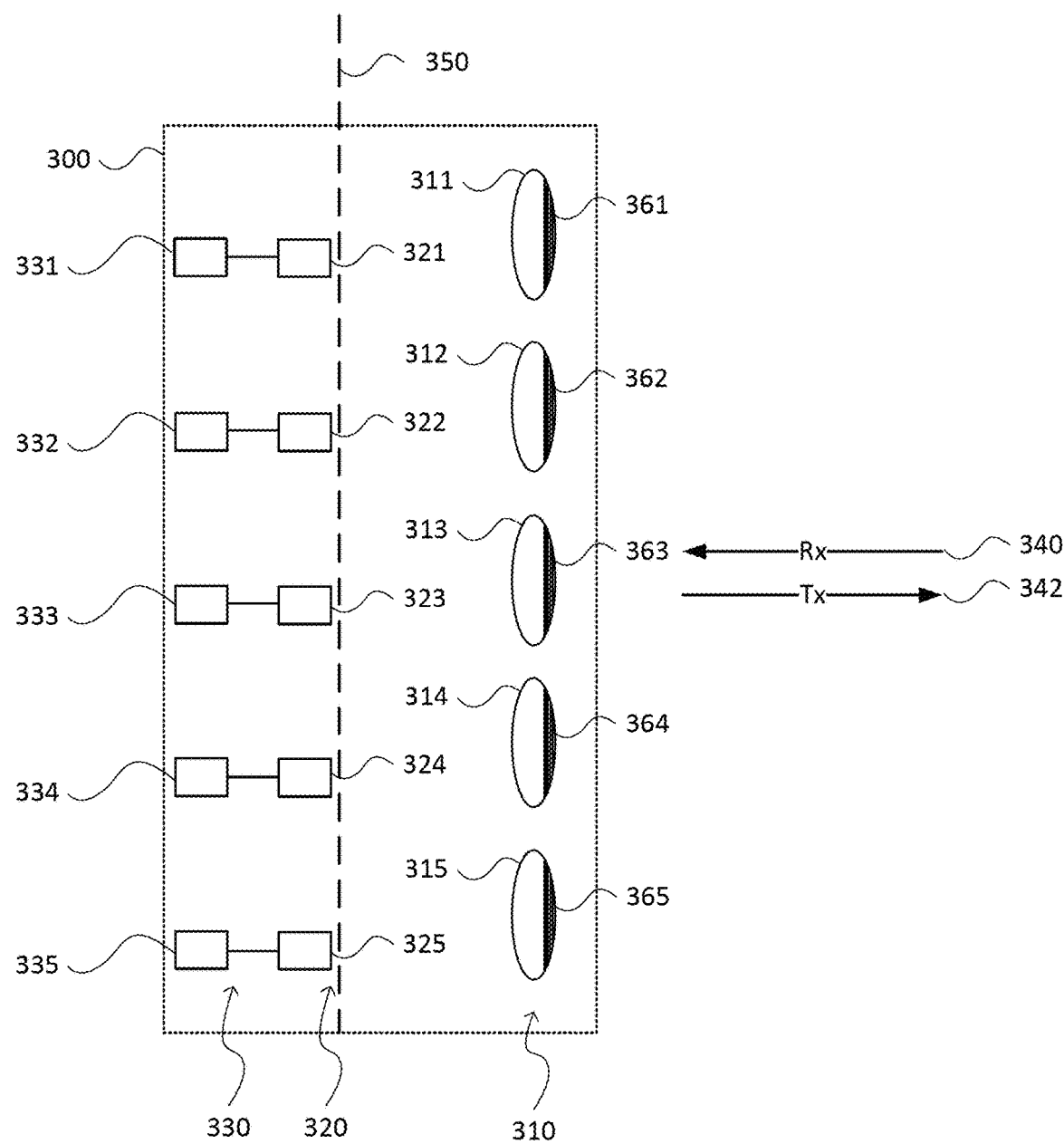
FIGS. 3A and 3B represent features of an OPA architecture represented as an example OPA chip in accordance with aspects of the disclosure.
Figure 3B:
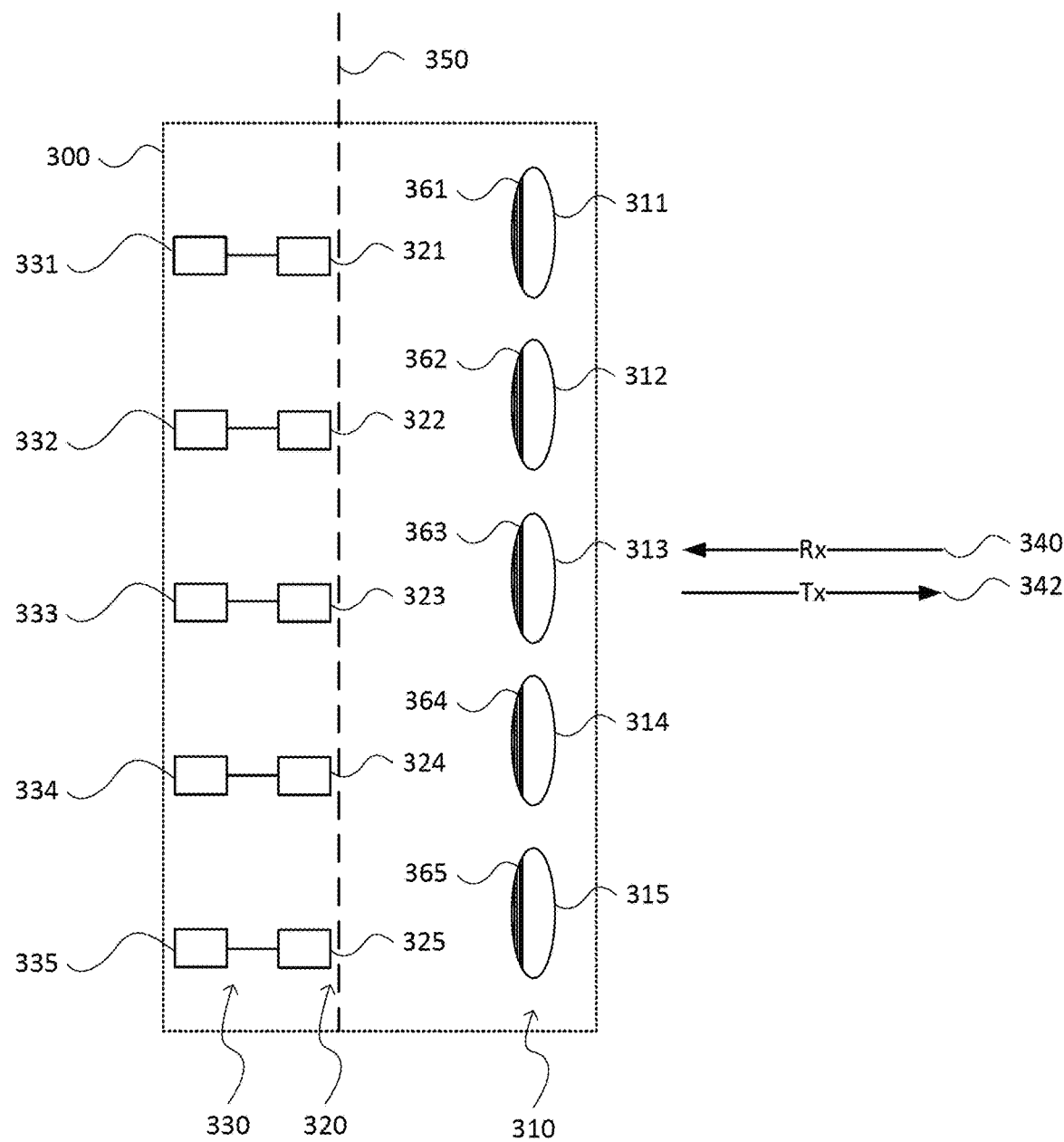

FIGS. 3A and 3B represent features of OPA architecture 114 represented as an example OPA chip 300 including representations of a micro-lens array 310, a plurality of emitters 320, and a plurality of phase shifters 330. For clarity and ease of understanding, additional waveguides and other features are not depicted. Arrows 340, 342 represent the general direction of Tx signals and Rx signals (transmitted and received light) as such signals pass or travel through the OPA chip 300.

The micro-lens array 310 may include a plurality of convex lenses 311-315 that focus the Rx signals onto respective ones of the plurality emitters positioned at the focal points of the micro-lens array. In this regard, the dashed-line 350 represents the focal plane of the micro-lenses 311-315 of the micro-lens array 310. The micro-lens array 310 may be arranged in a grid pattern with a consistent pitch, or distance, between adjacent lenses. In other examples, the micro-lens array 310 may be in different arrangements having different numbers of rows and columns, different shapes, and/or different pitch (consistent or inconsistent) for different lenses.

Each micro-lens of the micro-lens array may be 10's to 100's of micrometers in diameter and height. In addition, each micro-lens of the micro-lens array may be manufactured by molding, printing, or etching a lens directly into a wafer of the OPA chip 300. Alternatively, the micro-lens array 310 may be molded as a separately fabricated micro-lens array. In this example, the micro-lens array 310 may be a rectangular or square plate of glass or silica a few mm (e.g. 10 mm or more or less) in length and width and 0.2 mm or more or less thick. Integrating the micro-lens array within the OPA chip 300 may allow for the reduction of emitter size and an increase in the space between emitters. In this way, two-dimensional waveguide routing in the OPA architecture may better fit in a single layer optical phased array.

Each micro-lens of the micro-lens array may be associated with a respective emitter of the plurality of emitters 320. For example, each micro-lens may have an emitter from which Tx signals are received and to which the Rx signals are focused. As an example, micro-lens 311 is associated with emitter 321. Similarly, each micro-lens 312-315 may also have a respective emitter 322-325. In this regard, for a given pitch (i.e., edge length of a micro-lens edge length) the micro-lens focal length may be optimized for best transmit and receive coupling to the underlying emitters. This arrangement may thus increase the effective fill factor of the Rx signals at the respective emitter, while also expanding the Tx signals received at the micro-lenses from the respective emitter before the Tx signals leave the OPA chip 300.

The plurality of emitters 320 may be configured to convert emissions from waveguides to free space and vice versa. The emitters may also generate a specific phase and intensity profile to further increase the effective fill factor of the Rx signals and improve the wavefront of the Tx signals. The phase and intensity profile may be determined using inverse design or other techniques in a manner that accounts for how transmitted signals will change as they propagate to and through the micro-lens array. The phase profile may be different from the flat profile of traditional grating emitters, and the intensity profile may be different from the Gaussian intensity profile of traditional grating emitters. However, in some implementations, the emitters may be Gaussian field profile grating emitters.

The phase shifters 330 may allow for sensing and measuring Rx signals and the altering of Tx signals to improve signal strength optimally combining an input wavefront into a single waveguide or fiber. Each emitter may be associated with a phase shifter. As shown in FIGS. 3A and 3B, each emitter may be connected to a respective phase shifter. As an example, the emitter 320 is associated with a phase shifter 330. The Rx signals received at the phase shifters 331-335 may be provided to receiver components including the sensor 118, and the Tx signals from the phase shifters 331-335 may be provided to the respective emitters of the plurality of emitters 320. The architecture for the plurality of phase shifters 330 may include at least one layer of phase shifters having at least one phase shifter connected to an emitter of the plurality of emitters 320. In some examples, the phase shifter architecture may include a plurality of layers of phase shifters, where phase shifters in a first layer may be connected in series with one or more phase shifters in a second layer.

Each micro-lens may also include a series of concentric grooves which function as a micro-lens and a "global" lens structure across all of the plurality of micro-lenses of the micro-lens array. The micro-lens can be designed utilizing numerous different lens structures including fresnel lens, diffractive lens or meta-lens implementing micro-grooves, multi-step grooves or wavelength size pillars as the concentric grooves. For instance, the concentric grooves may result in Fresnel lens structure on each micro-lens and a "global" Fresnel lens structure across all of the plurality of micro-lenses of the micro-lens array. The density and height of the grooves may be selected based upon the focal length of the micro-lenses. In this regard, a plurality of concentric grooves 361-365 (represented by the darkened grooves in the micro-lenses 311-315) may be incorporated into external surfaces (oriented towards from the plurality of emitters 320) of the micro-lenses of the micro-lens array 310 as depicted in FIG. 3A or onto internal surfaces (oriented towards from the plurality of emitters 320) of the micro-lenses of the micro-lens array 310 as depicted in FIG. 3B.

The concentric grooves may be imprinted on a surface of the micro-lenses as part of an etching or the molding process for manufacturing the micro-lenses. The concentric grooves on each micro-lens may increase the local wavefront tilt and result in a similar "global" effect across the micro-lens array of the OPA architecture. Such a configuration may provide for an automatic alignment between the concentric grooves and the micro-lenses of the micro-lens array.

In instances where the micro-lens array 310 is a molded micro-lens array, the concentric grooves may be molded onto the side of the molded micro-lens array opposite of the micro-lens features (such as in the example configuration depicted in FIG. 3B). The micro-lens features may be molded onto one of the surfaces of the plate and the concentric grooves may be molded onto the opposite side of the plate. Such a configuration may provide for an automatic alignment between the concentric grooves and the micro-lens features of the molded micro-lens array. Also, the plate would save the losses associated with having more glass-air interfaces (though these may have anti-reflective coatings).

Returning to FIG. 1, the second communications terminal 122 may output the Tx signals as an optical communications beam 20b (e.g., light) pointed towards the first communications terminal 102, which receives the optical communications beam 20b (e.g., light) as corresponding Rx signals. In this regard, the second communications terminal 122 include one or more processors, 124, a memory 126, a transceiver chip 132, and an OPA architecture 134. The one or more processors 124 may be similar to the one or more processors 104 described above. Memory 126 may store information accessible by the one or more processors 124, including data 128 and instructions 130 that may be executed by processor 124. Memory 126, data 128, and instructions 130 may be configured similarly to memory 106, data 108, and instructions 110 described above. In addition, the transceiver chip 132 and the OPA architecture 134 of the second communications terminal 122 may be similar to the transceiver chip 112 and the OPA architecture 114. The transceiver chip 132 may include both transmitter components and receiver components. The transmitter components may include a light source, such as seed laser 136 configured similar to the seed laser 116. Other transmitter components may include an amplifier, such as a high-power semiconductor optical amplifier. The receiver components may include a sensor 138 configured similar to sensor 118. Other receiver components may include an attenuator, such as a variable optical attenuator, an amplifier, such as a semiconductor optical amplifier, or a filter. The OPA architecture 134 may include an OPA chip including a micro-lens array, a plurality of emitters, a plurality of phase shifters, which may be similar to OPA chip 300, micro-lens array 310, plurality of emitters 320, and plurality of phase shifters 330, respectively. Additional components for supporting functions of the communications terminal 122 may be included similar to the additional components described above. The communications terminal 122 may have a system architecture that is same or similar to the system architecture shown in FIG. 2.

A communication link 22 may be formed between the first communications terminal 102 and the second communications terminal 122 when the transceivers of the first and second communications terminals are aligned. The alignment can be determined using the optical communications beams 20a, 20b to determine when line-of-sight is established between the communications terminals 102, 122. Using the communication link 22, the one or more processors 104 can send communication signals using the optical communications beam 20a to the second communications terminal 122 through free space, and the one or more processors 124 can send communication signals using the optical communications beam 20b to the first communications terminal 102 through free space. The communication link 22 between the first and second communications terminals 102, 122 allows for the bi-directional transmission of data between the two devices. In particular, the communication link 22 in these examples may be free-space optical communications (FSOC) links. In other implementations, one or more of the communication links 22 may be radio-frequency communication links or other type of communication link capable of traveling through free space.

Figure 4:
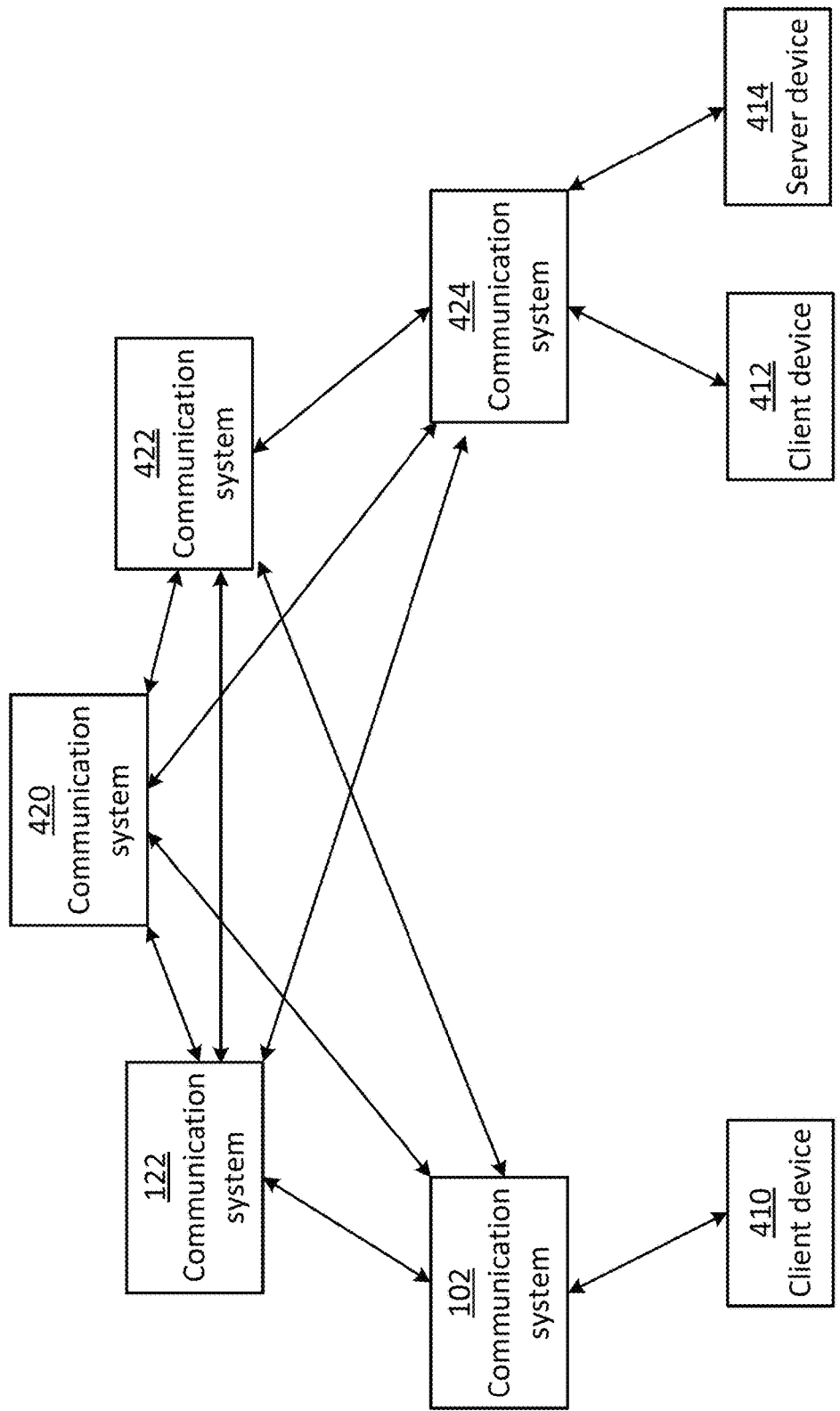
FIG. 4 is a pictorial diagram of a network in accordance with aspects of the disclosure.

As shown in FIG. 4, a plurality of communications terminals, such as the first communications terminal 102 and the second communications terminal 122, may be configured to form a plurality of communication links (illustrated as arrows) between a plurality of communications terminals, thereby forming a network 400. The network 400 may include client devices 410 and 412, server device 414, and communications terminals 102, 122, 420, 422, and 424. Each of the client devices 410, 412, server device 414, and communications terminals 420, 422, and 424 may include one or more processors, a memory, a transceiver chip, an OPA architecture (e.g., OPA chip or chips) similar to those described above. Using the transmitter and the receiver, each communications terminal in network 400 may form at least one communication link with another communications terminal, as shown by the arrows. The communication links may be for optical frequencies, radio frequencies, other frequencies, or a combination of different frequency bands. In FIG. 4, the communications terminal 102 is shown having communication links with client device 410 and communications terminals 122, 420, and 422. The communications terminal 122 is shown having communication links with communications terminals 102, 420, 422, and 424.

The network 400 as shown in FIG. 4 is illustrative only, and in some implementations the network 400 may include additional or different communications terminals. The network 400 may be a terrestrial network where the plurality of communications terminals is on a plurality of ground communications terminals. In other implementations, the network 400 may include one or more high-altitude platforms (HAPs), which may be balloons, blimps or other dirigibles, airplanes, unmanned aerial vehicles (UAVs), satellites, or any other form of high-altitude platform, or other types of moveable or stationary communications terminals. In some implementations, the network 400 may serve as an access network for client devices such as cellular phones, laptop computers, desktop computers, wearable devices, or tablet computers. The network 400 also may be connected to a larger network, such as the Internet, and may be configured to provide a client device with access to resources stored on or provided through the larger computer network.

Example Methods

Figure 5A:
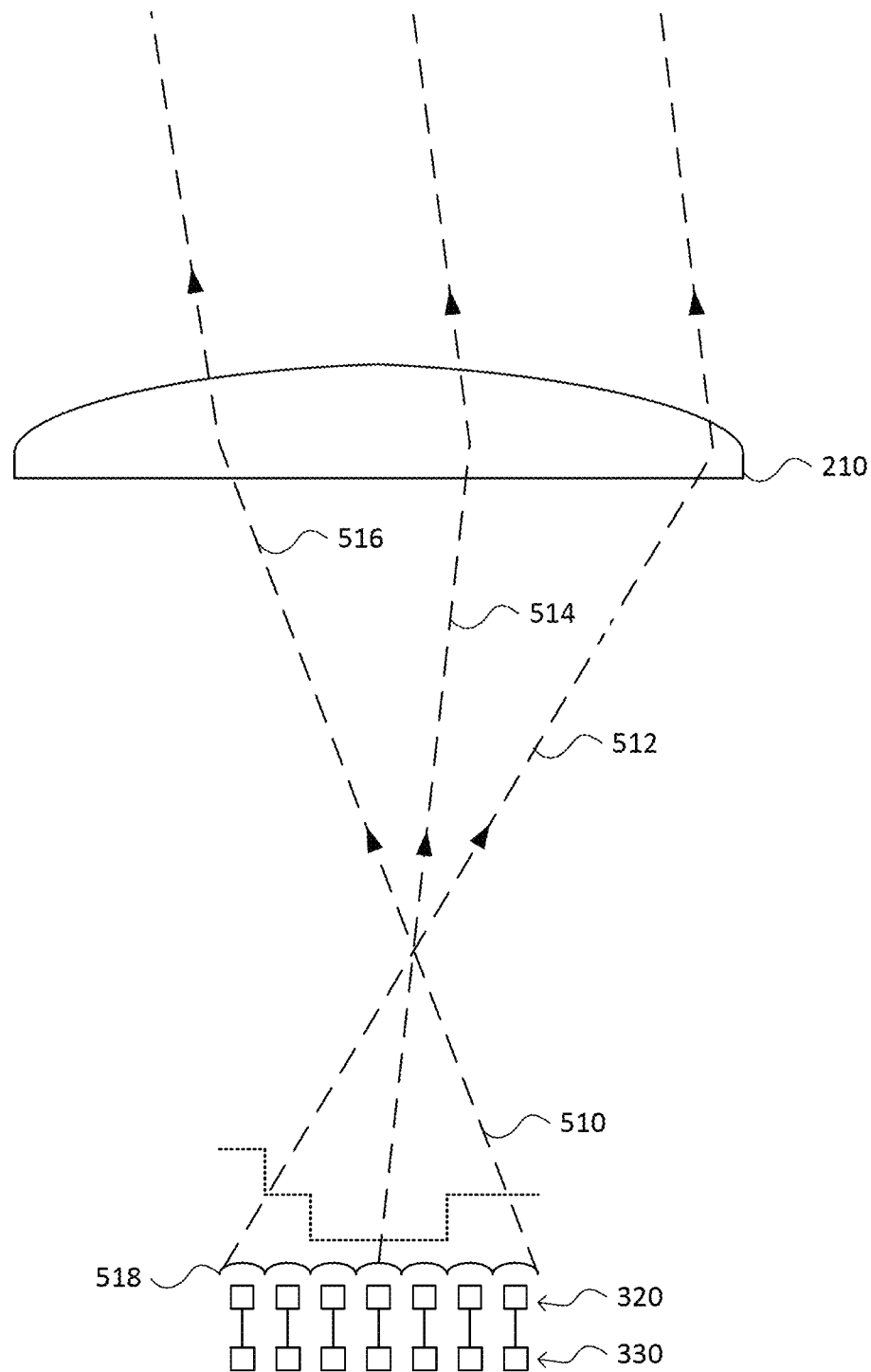
FIGS. 5A-5C are representations of the path of signals through a portion of an OPA chip in accordance with aspects of the disclosure.
Figure 5B:
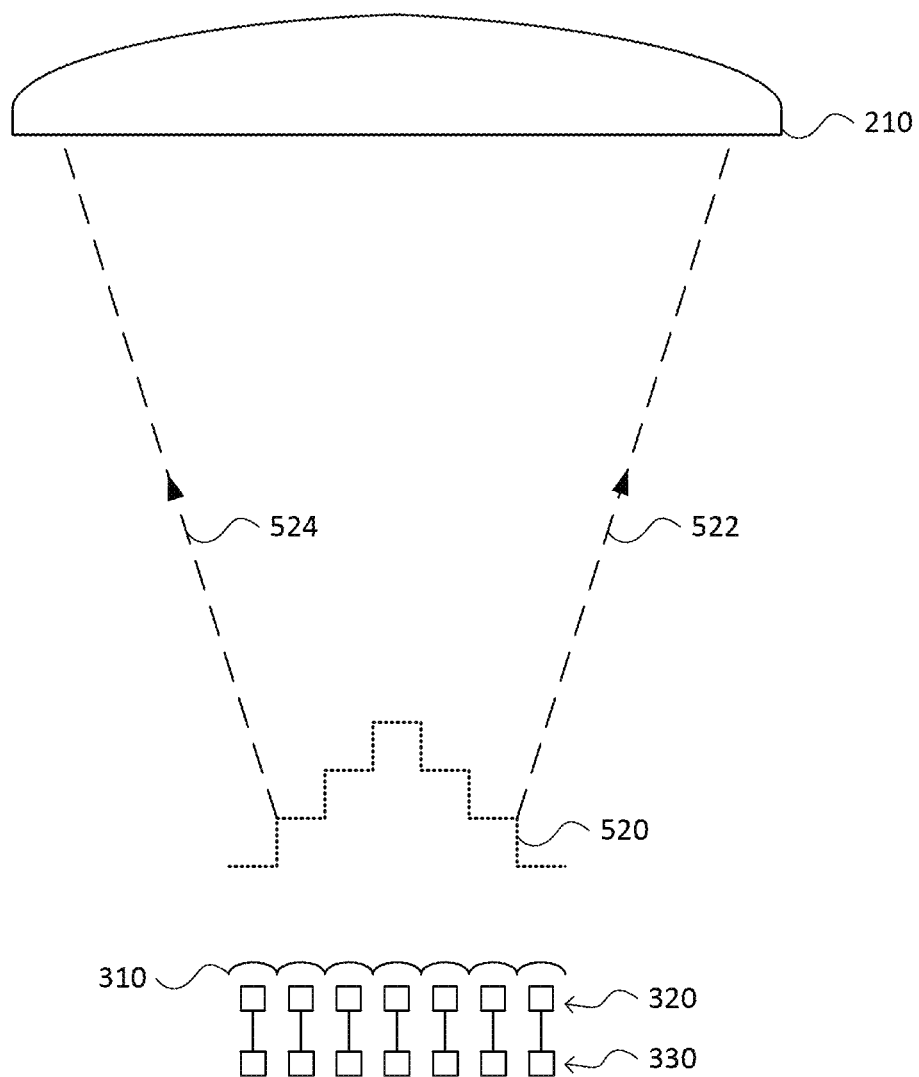
Figure 5C:
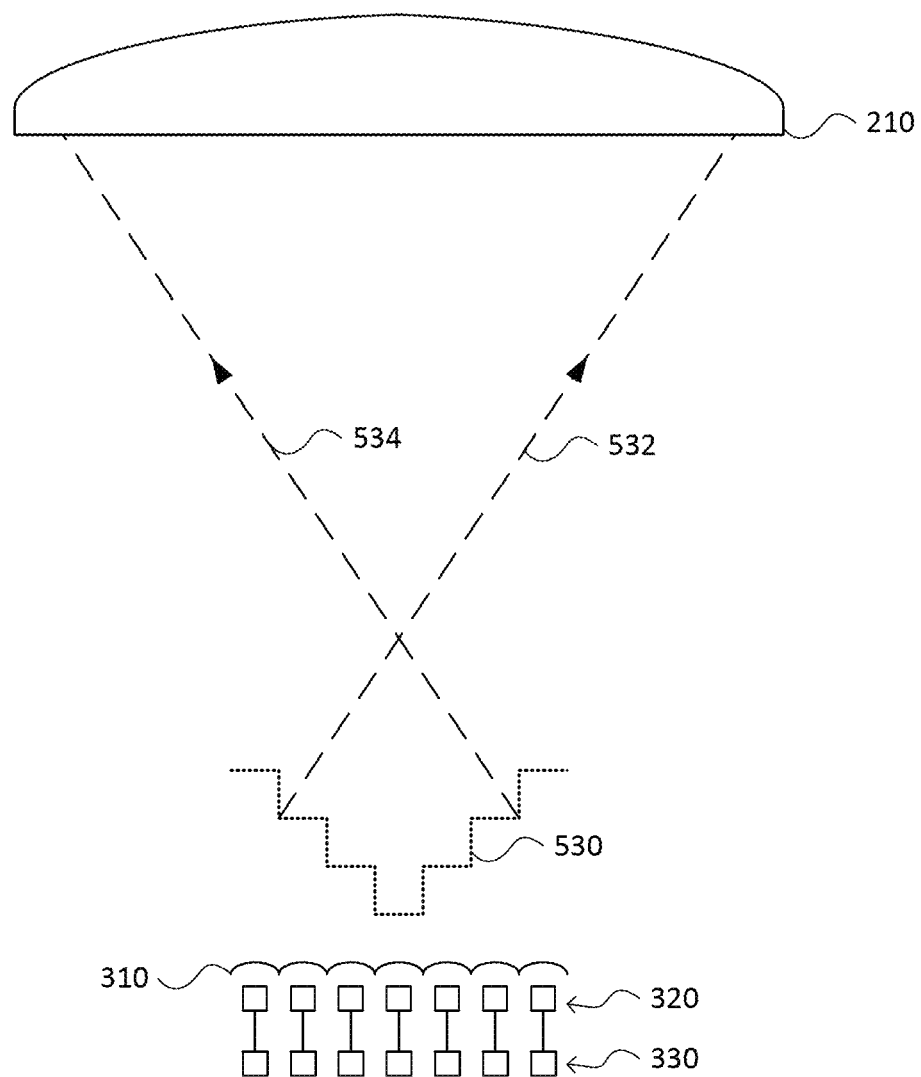

In operation, the Tx and Rx signals may pass through the concentric grooves of the micro-lens array when being transmitted (Tx signals) or received (Rx signals). FIGS. 5A-5C are example representations of the generation of a stair-step approximation of a spherical converging or diverging wavefront which may be generated by the OPA chip 300. For ease of understanding, FIGS. 5A-5B exaggerate the divergence currently available with the OPA architecture described herein using an operating wavelength of 1550 nm.

FIG. 5A depicts a wavefront 510 corresponding to Tx signals 512, 514, 516. Such a wavefront may be produced by the plurality of phase shifters 330 and emitters 320 in combination with a micro-lens array 518 without the concentric grooves of the micro-lens array 310. FIG. 5B depicts a wavefront 520 corresponding to Tx signals 522, 524. Such a wavefront produced by the plurality of phase shifters 330 and emitters 320 in combination with the concentric grooves of the micro-lens array 310 may allow for the replacement of the second lens (e.g. second lens 212) in a Galilean telescope.

FIG. 5C depicts a wavefront 530 corresponding to Tx signals 532, 534. Such a wavefront produced by the plurality of phase shifters 330 and emitters 320 in combination with the concentric grooves of the micro-lens array 310 may allow for the replacement of the second lens (e.g. second lens 212) in a Keplerian telescope.

The spherical wavefronts 510, 520, 530 may contain a component of tilt which may be a result of a steering of the beam by the phase shifters OPA architecture as well as the divergence resulting from the Tx signal passing through the concentric grooves. The concentric grooves may enable even larger divergence of a Tx signal (beam) than possible via the phase shifters alone. For example, the concentric grooves may be expected to cause divergence in the Tx signal of cone angles of up to 10 or 20 degrees. When the Tx signal passes through these surfaces, the Tx signal (beam) is expanded, whereas when the Rx signal (beam) passes through these surfaces, the Rx signal is focused (narrowed). In this regard, a Tx signal going outward from the OPA architecture would become converging or diverging spherical beam depending on the telescope configuration, while the Rx signal inward from first lens 210 would have its spherical wavefront flattened as it enters the OPA architecture.

Figure 6:
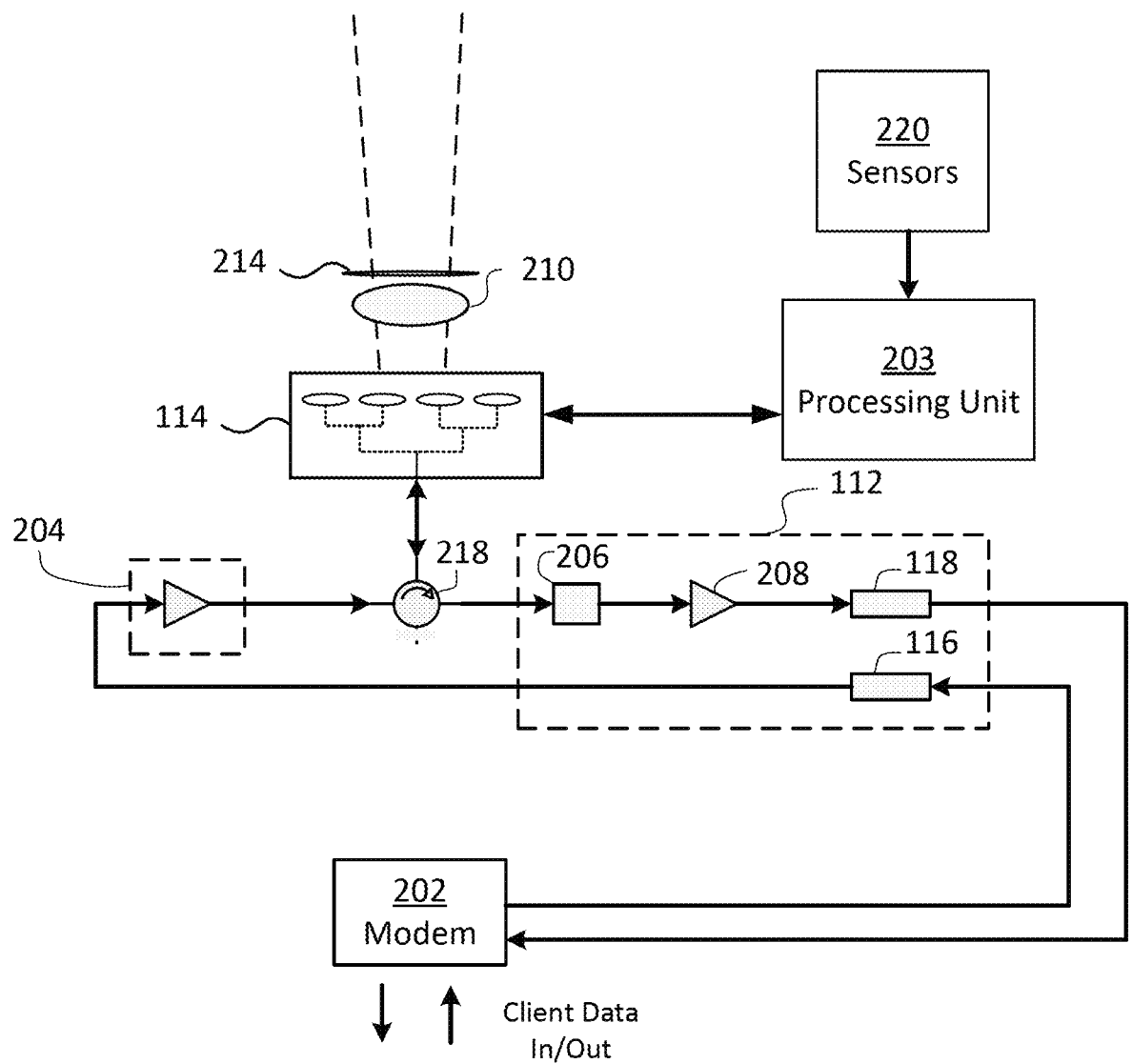
FIG. 6 is an example system architecture for the first communication device of FIG. 1 in accordance with aspects of the disclosure.

Thus, the concentric grooves may provide the same function as the smaller lens or second optic in a beam expansion telescope, such as second lens 212 as well as other lenses in the system such as relay lenses (not shown), as represented in the example terminal 600 of FIG. 6. Such larger divergence angles may therefore allow a more compact beam expansion telescope, due to closer placement of the second lens to the OPA architecture 114.

Figure 7:
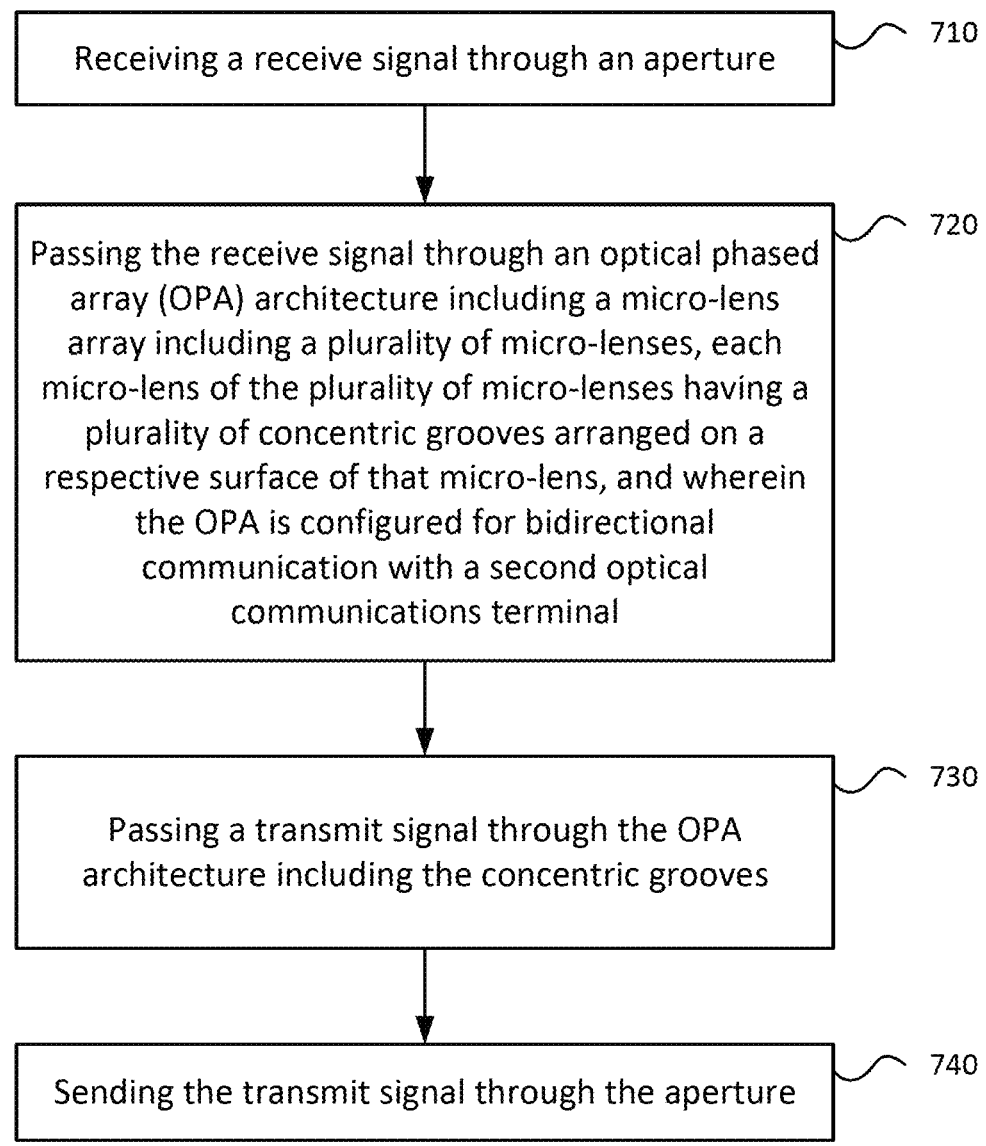
FIG. 7 is a flow diagram in accordance with aspects of the disclosure.

FIG. 7 is an example flow diagram 700 of transmitting and receiving signals in a communications terminal, such as the communications terminal 102 or 122, in accordance with some of the aspects described above. While FIG. 7 shows blocks in a particular order, the order may be varied and that multiple operations may be performed simultaneously. Also, operations may be added or omitted. In this example, the communications terminal 102 or 122 receives a signal through an aperture at block 710.

At block 720, the received signal is passed through an optical phased array (OPA) including a micro-lens array including a plurality of micro-lenses. Each micro-lens of the plurality of micro-lenses having a plurality of concentric grooves on a respective surface of that micro-lens. For example, Rx signals may be passed through the communications terminal 102 to the OPA chip 300. As noted above, the OPA chip 300 may include a micro-lens array 310 including a plurality of micro-lenses 311-315. Each of the micro-lenses 311-315 of the micro-lens array 310 includes a plurality of concentric grooves on a respective surface of that micro-lens. In this regard, the Rx signals may pass through the concentric grooves which focus or narrow the Rx signals.

At block 730 a transmit signal is sent through the optical phased array including the plurality of concentric grooves. In this regard, the Tx signals may pass through the concentric grooves which expand or diverge the Tx signals. Thereafter at block 740, the transmit signal is sent through the aperture.

The global effect of the concentric grooves may emulate the effect of the first lens of a beam expansion telescope. As such, by utilizing a global Fresnel lens surface incorporated on the micro-lenses of the micro-lens array, one or more of the optical elements of a typical beam expansion telescope (e.g., the second lens 212) may be removed. Removing the second lens may significantly reduce the overall length required for expansion of the Tx signal. This, in turn and as represented in FIG. 6, may save significant space within the communication terminal and allow for a smaller overall size without requiring additional steering or other mirrors or other features. However, in this example, the first lens 210 would still be required to re-collimate the Tx signal prior to launch from the communications terminal. In some instances, this may be a fairly significant reduction in size, weight, and cost of the communication terminal as compared to a communication terminal that utilizes a typical beam expansion telescope.

While the OPA architecture may support hundreds to greater than hundreds of thousands of phase shifters, this approach may be especially suitable for OPA architectures that utilize fewer numbers of phase shifters (phased array elements for each micro-lens of the micro-lens array) such as 8×8 or smaller (e.g., 64 or fewer phase shifters in the OPA).

The features described herein may provide an OPA architecture suitable for use in a communications terminal. Removing the second optic may significantly reduce the overall length required for expansion of the Tx signal. This, in turn, may save significant space within the communication terminal and allow for a smaller overall size without requiring additional steering or other mirrors or other features. In some instances, this may be a fairly significant reduction in size, weight, complexity and cost of the communication terminal as compared to a communication terminal that utilizes a typical beam expansion telescope.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples: rather, the examples are intended to illustrate only one of many possible embodiments. Further, the same reference numbers in different drawings can identify the same or similar elements.

The invention claimed is:

1. A system comprising:
    a first optical communications terminal comprising:
        a common aperture for transmitting signals and receiving signals; and
        an optical phased array (OPA) architecture including a micro-lens array including a plurality of micro-lenses, each micro-lens of the plurality of micro-lenses having a plurality of concentric grooves arranged on a respective surface of that micro-lens, and wherein the OPA is configured for bidirectional communication with a second optical communications terminal.

2. The system of claim 1, further comprising the second optical communications terminal.

3. The system of claim 1, wherein the pluralities of concentric groves are imprinted on the respective surfaces of the plurality of micro-lenses.

4. The system of claim 1, wherein each of the pluralities of concentric grooves functions as a Fresnel lens structure.

5. The system of claim 4, wherein the Fresnel lens structures are configured to:
    expand a transmit signal prior to launch of the transmit signal from first communications terminal; and
    focus a received signal received at the first optical communications terminal from the second optical communications terminal.

6. The system of claim 1, wherein the OPA architecture further includes an arrangement of 64 phase shifters or fewer.

7. A method of transmitting and receiving light in an optical communications terminal, the method comprising:
    receiving a receive signal through an aperture;
    passing the receive signal through an optical phased array (OPA) architecture including a micro-lens array including a plurality of micro-lenses, each micro-lens of the plurality of micro-lenses having a plurality of concentric grooves on a respective surface of that micro-lens;
    passing a transmit signal through the optical phased array including the plurality of concentric grooves; and
    sending the transmit signal through the aperture.

8. The method of claim 7, wherein each of the pluralities of concentric grooves functions as a Fresnel lens structure.

9. The method of claim 7, wherein one of the pluralities of concentric grooves cause the transmit signal to expand when passed through a corresponding one of the plurality of micro-lenses.

10. The method of claim 7, wherein one of the pluralities of concentric grooves cause the receive signal to contract when passed through a corresponding one of plurality of micro-lenses.

* * * * *